United States Patent
Sumetsky

(10) Patent No.: US 8,036,503 B2
(45) Date of Patent: Oct. 11, 2011

(54) LOW LOSS OPTICAL DELAY LINE USING A MICROFIBER COIL

(75) Inventor: Mikhail Sumetsky, Bridgewater, NJ (US)

(73) Assignee: DFS Fitel LLC, Norcross, GA (US)

( * ) Notice: Subject to any disclaimer, the term of this patent is extended or adjusted under 35 U.S.C. 154(b) by 182 days.

(21) Appl. No.: 12/587,767

(22) Filed: Oct. 13, 2009

(65) Prior Publication Data

US 2010/0209061 A1    Aug. 19, 2010

Related U.S. Application Data

(60) Provisional application No. 61/153,722, filed on Feb. 19, 2009, provisional application No. 61/156,565, filed on Mar. 2, 2009.

(51) Int. Cl.
*G02B 6/26* (2006.01)
*G02B 6/42* (2006.01)

(52) U.S. Cl. ............ 385/27; 385/31; 385/100; 385/123; 385/124

(58) Field of Classification Search .................. 385/27, 385/31, 100, 123, 124
See application file for complete search history.

(56) References Cited

U.S. PATENT DOCUMENTS

| | | | |
|---|---|---|---|
| 5,953,121 A | 9/1999 | Bohnert et al. | |
| 6,301,400 B1 | 10/2001 | Sanders | |
| 6,493,120 B1 | 12/2002 | Tancevski | |
| 6,661,950 B1 | 12/2003 | Strecker | |
| 6,707,975 B2 | 3/2004 | Bueshelberger et al. | |
| 6,934,431 B2 | 8/2005 | Braun et al. | |
| 6,990,269 B2 | 1/2006 | Ohno et al. | |
| 7,218,803 B1 | 5/2007 | Sumetsky | |
| 7,266,259 B1 | 9/2007 | Sumetsky | |
| 7,369,716 B2 | 5/2008 | Berg et al. | |
| 2005/0207713 A1 | 9/2005 | Mazur et al. | |
| 2008/0063344 A1 | 3/2008 | Suzuki et al. | |
| 2008/0101753 A1 | 5/2008 | Suzuki et al. | |
| 2009/0059233 A1 | 3/2009 | Sumetsky | |
| 2009/0092365 A1 * | 4/2009 | Donlagic | 385/124 |

\* cited by examiner

*Primary Examiner* — Brian M. Healy
*Assistant Examiner* — Mary El-Shammaa
(74) *Attorney, Agent, or Firm* — Wendy W. Koba

(57) ABSTRACT

An optical delay line is formed from a coil of optical fiber (in many cases microfiber), where the radius of the optical fiber is greater than the wavelength λ of the propagating signal and the radius R of the coil is selected, in consideration with the optical fiber radius, to limit propagation loss by minimizing coupling between adjacent turns of the coil. The difference in dimension between the fiber diameter and wavelength prevents the mode propagating along one turn from coupling into an adjacent turn. It has been discovered that the modal intensity at the interface between the central rod and the coil will be minimized when the radius of the fiber satisfies the following condition:

$$r \gg \left(\frac{R}{\beta^2}\right)^{1/3},$$

where $\beta = (2\pi n)/\lambda$, and n is the refractive index of the fiber.

16 Claims, 3 Drawing Sheets

LOW LOSS OPTICAL DELAY LINE USING A MICROFIBER COIL

CROSS-REFERENCE TO RELATED APPLICATIONS

This application claims the benefit of U.S. Provisional Application Nos. 61/153,722 filed Feb. 19, 2009 and 61/156,565 filed Mar. 2, 2009, which are hereby incorporated by reference.

TECHNICAL FIELD

The present invention relates to an optical delay line and, more particularly, to an optical delay line comprising a microfiber coil of dimensions that allow for the fundamental mode of an optical signal to propagate along the delay line with relatively low loss.

BACKGROUND OF THE INVENTION

An optical delay line, or buffer, is a key element of the future photonic circuits for optical signal processing in applications such as communications and computing. Conventionally, an optical delay line consisted of one or more sections of optical fiber, where the length of the fiber determined the delay introduced into the propagating signal. For example, a standard optical fiber having a length of about 20 meters (m) will introduce a 100 nanosecond (ns) delay to a pulse of light. To provide compact packaging of this type of delay device, the 20 m of fiber would be coiled to fit into a relatively small package. The ultimate size of the package is limited, at least in one sense, by the bend loss of the optical fiber, which increases with decreasing radius of the coil. For a 20 m length of fiber, for example, a package in the form of a box having dimensions of several cubic centimeters is required to minimize the impact of bend loss. With the on-going efforts to miniaturize optical components, these dimensions are becoming problematic.

In contrast to fiber-based delay lines, integrated photonic components such as microsphere or microtoroid resonators have been demonstrated to provide a similar amount of delay (i.e., hundreds of nanoseconds) in component sizes ranging from several tens of microns to several millimeters. While the amount of introduced delay falls within the desired range, the delay time/bandwidth product limitation of these microresonators restricts the corresponding bandwidths to pulses of about 1 MHz only (i.e., hundreds of ns delay and a bandwidth of only 0.00001 nanometer (nm)). This bandwidth is far too small for these microstructured resonators to be considered as a realistic optical buffer for commercial systems.

Thus, a need remains for an optical delay element that has a larger bandwidth than the known microresonator devices, yet is more compact than conventional fiber delay lines without introducing loss or reliability issues.

SUMMARY OF THE INVENTION

The present invention relates to an optical delay line formed from a coil of optical fiber (in most cases, a microfiber) where the diameter of the optical fiber is greater than the wavelength of the propagating signal and the radius of the coil is selected, in consideration of the optical fiber diameter, to limit propagation loss by minimizing coupling between adjacent turns of the coil.

In one embodiment, an optical delay line includes an optical fiber of a radius r (2r>λ, where λ is the wavelength of the propagating optical signal) coiled on a central core rod having a radius R. The central core rod may be removed once the coil has been formed. The fiber may be coiled with or without spacing between adjacent turns; the difference in dimension between the fiber diameter and wavelength inhibits the mode propagating along one turn from coupling into an adjacent turn. It has been discovered that the modal intensity at the interface between the central rod and the coil will be minimized when the radius of the optical fiber satisfies the following condition:

$$r \gg \left(\frac{R}{\beta^2}\right)^{1/3}, \quad (1)$$

where $\beta=(2\pi n)/\lambda$, and n is the refractive index of the optical fiber.

Embodiments of the present invention relate to a device that combines the advantages of the conventional optical fiber delay line (broadband and low loss) with those of the optical microresonator (compact and low loss). At this same time, the inventive device does not exhibit the drawbacks of either type of prior art delay element—the unwanted large size of an optical fiber delay line, or the unnecessarily narrow bandwidth of an optical microresonator. In one exemplary embodiment, a silica microfiber having a diameter (2r) ranging from about 5 μm to about 100 μm is coiled onto a rod with a diameter (2 R) ranging from about 100 μm to about 10 mm, respectively. After fabrication of the fiber coil, any strain which may have been introduced by the coiling process can be relaxed with a thermal treatment. Also, as mentioned above, the central core rod may be removed, if desired, once the coil is formed.

The low loss optical fiber coil delay line of the present invention can be used in a variety of applications, such as an optical gyroscope, amplifier, sensor, and the like. The relatively small size and robust nature of the inventive element permits its use in association with photonic circuit-based arrangements. Indeed, the present invention may be configured as a tunable optical delay line, with various sections of optical fiber coil being controlled by a switch to either be added to, or eliminated from, an optical signal path.

Other and further properties and uses for the microfiber coil delay element of the present invention will become apparent during the course of the following discussion and by reference to the accompanying drawings.

BRIEF DESCRIPTION OF THE DRAWINGS

Referring now to the drawings,

FIG. 4 illustrates the effect of core radius on mode field intensity for a microfiber embodiment of the present invention, where

DETAILED DESCRIPTION

Figure 1:
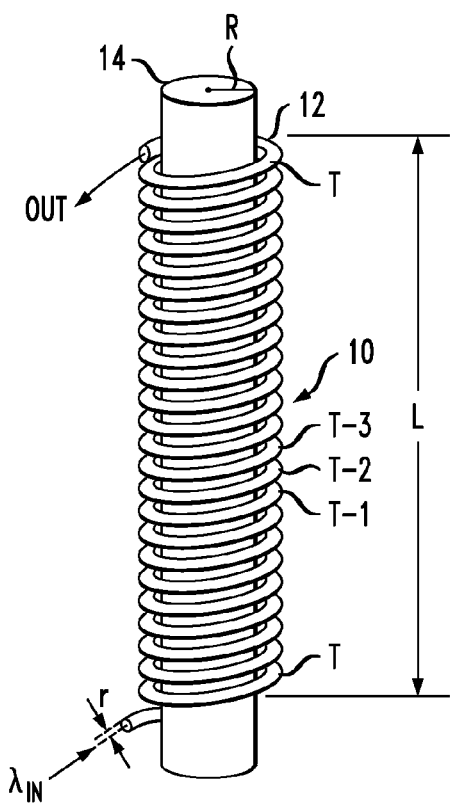
FIG. 1 illustrates an exemplary optical fiber coil delay line formed in accordance with the present invention.

FIG. 1 illustrates an exemplary optical microfiber coil delay line 10 formed in accordance with the present invention. Delay line 10 comprises a section of optical microfiber 12 which is wound around a central core rod 14. For purposes of the present invention, an optical "microfiber" is defined as an optical fiber with a diameter in the range of about 5-100 µm, with little or no delineation between a central "core" region and a surrounding cladding layer, and used to propagate a fundamental mode of an optical signal. For the purposes of the present invention, the diameter of microfiber 12 needs to be greater than the wavelength of the propagating signal. For example, when used with a communication signal having a wavelength of 1550 nm, the diameter of the microfiber needs to be about 2 µm or more. Obviously, for different wavelength regimes, different limitations on the microfiber radius will apply. Moreover, there may be instances where it is desirable to use conventional optical fiber (or fibers having the same dimensions as conventional optical fiber) instead of microfiber in the delay device of the present invention. Thus, in its broadest scope, the present invention is directed to the formation of a coil optical fiber delay line, with the fiber radius r and coil radius R controlled to minimize loss. The following discussion concerning an implementation with "microfiber 12" is therefore considered to be exemplary only.

As with conventional optical delay elements, the length L of coil 10 determines the time extent of the introduced delay. Indeed, for a central core rod 14 of a given diameter 2 R, the introduced delay will increase by increasing the number of turns T of fiber 12 which are wound around central core rod 14. When using a central core rod of a different diameter, it is to be understood that a different number of turns would be used to provide the same time delay interval.

Propagation loss along coil 10 is minimized when the fundamental mode of the incoming optical signal propagating along a given turn of the coil does not interact with either central core rod 14 or adjacent turns of coil 10. Thus, by limiting the effect of physical contact between the central core rod and the coil, as well as between adjacent turns of the coil, scattering of the optical signal and coupling between turns will be minimized, significantly reducing the presence of bend loss along the optical fiber coil. In accordance with the present invention, it has been found that by confining the mode field intensity of a propagating signal to a region of the optical fiber removed from these problematic contact points, loss in the propagating optical signal is minimized.

In particular, by controlling the relation between the radius r of microfiber 12 and the radius R of central core rod 14. In particular, low loss is achieved when the following relation is satisfied:

$$r \gg \left(\frac{R}{\beta^2}\right)^{1/3}, \quad (1)$$

where $\beta=(2\pi n)/\lambda$, n is the refractive index of microfiber 12 and $\lambda$ is the wavelength of the propagating optical signal.

Figure 2:
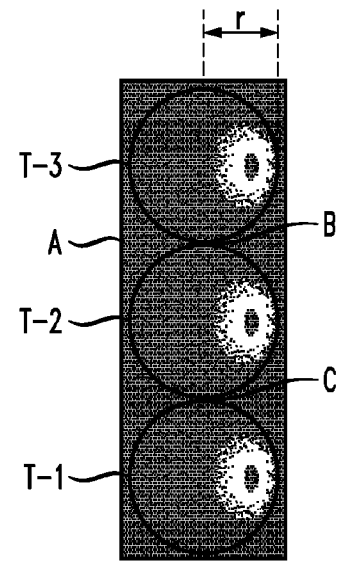
FIG. 2 shows an exemplary mode field intensity for a set of three adjacent turns T-1, T-2 and T-3 of an optical fiber coil delay line of the present invention.

FIG. 2 shows an exemplary mode field intensity for a set of three adjacent turns T−1, T−2 and T−3 selected from an optical microfiber coil formed in accordance with the present invention. Interface A defines the area where microfiber 12 contacts central core rod 14 as each turn T is wound around central core rod 14. Interface B defines the contact location between turns T−3 and T−2 and interface C defines the contact location between turns T−2 and T−1. As clearly shown in FIG. 2, by following the relation between r and R as outlined above, the mode field intensity is shifted away from interfaces A, B and C, and is instead confined to an outer peripheral area of each turn T in coil 10. Since little, if any, of the intensity in this outer peripheral area of turn T interacts with central core rod 14 or with the turns immediately below and above turn T (referred to as turns T−1 and T+1, respectively), the desired low loss condition for the inventive delay line is achieved.

Figure 3:
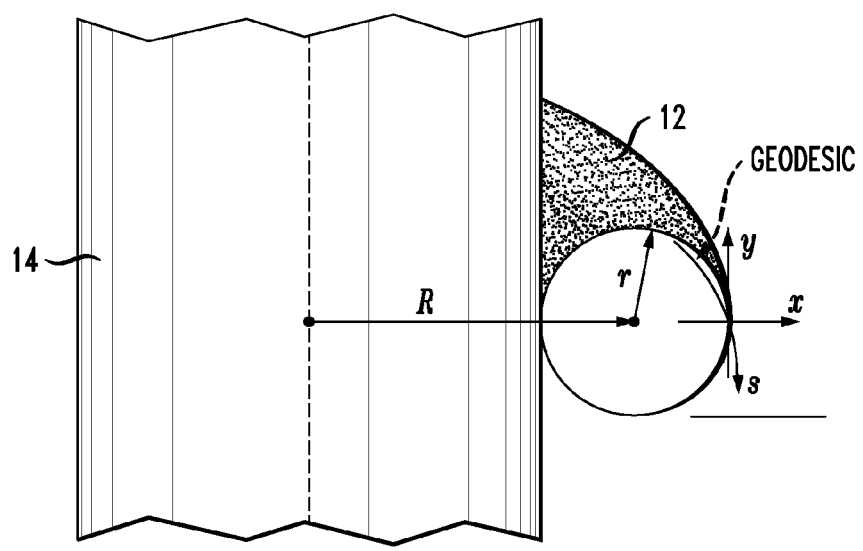
FIG. 3 is a diagram illustrating the relationship between the central core rod radius R and the microfiber radius r, expressed using a geodesic with longitudinal and radial coordinates.

This relationship between microfiber radius r and coil radius R was developed from the understanding that the fundamental mode, as well as nearby higher-order modes, of a curved optical fiber can be viewed as modes that propagate in the vicinity of a geodesic situated at an external part of a microfiber surface, as shown in FIG. 3. The local coordinates near this geodesic are shown as the longitudinal coordinate and transversal coordinates x and y. Using the known short wavelength scalar diffraction theory, a simple asymptotic solution can be derived for the propagation mode with transverse quantum numbers m and n as follows:

$$E_{min}(x, y, s) \approx \exp[i\beta_{mn}s]\exp(-1/2Y^2)H_m(Y)Ai(-X-t_n),$$

$$X = \left(\frac{2\beta^2}{R}\right)^{\frac{1}{3}}\left(x - \frac{y^2}{2r}\right), Y = \left(\frac{\beta^2}{Rr}\right)^{\frac{1}{4}}y, \beta = \frac{2\pi n}{\lambda},$$

where r and R are the radii of the optical fiber and central core rod as defined above, $\lambda$ is the operating wavelength, $H_m(x)$ is the Hermite polynomial, $Ai(x)$ is the Airy function, $t_n$ is the root of the Airy function ($t_0$=2.338, $t_1$=4.088, $t_2$=5.52, . . . ), n is the refractive index of the optical fiber and $\beta_{mn}$ is the propagation constant of mode (m,n) as given by:

$$\beta_{mn} = \beta - 2^{-\frac{1}{3}}t_n\beta^{\frac{1}{3}}R^{-\frac{2}{3}} - \left(m+\frac{1}{2}\right)(Rr)^{-\frac{1}{2}}.$$

For the purposes of the present discussion, it will be presumed that the coil is created from uniform elements; that is, the radii r and R remain constant. Thus, both r and R are independent of the longitudinal coordinate, s. However, the scope of the invention is not so limited and solutions can be obtained for optical fiber coils having either a nonuniform fiber radius r(·), a nonuniform coil radius R(·), or a combination of the two. For fundamental mode propagation where m,n~1, the propagating signal will exhibit strong localization near the geodesic s and the relation between r and R is as shown above. Indeed, for optical communication system applications, for example, phase diversity systems utilizing delay, where n=1.5 and λ=1.5 µm, the relation between r and R (in microns) can be approximated by:

$$r = 0.7 R^{\frac{1}{3}}. \qquad (2)$$

Figure 4A:
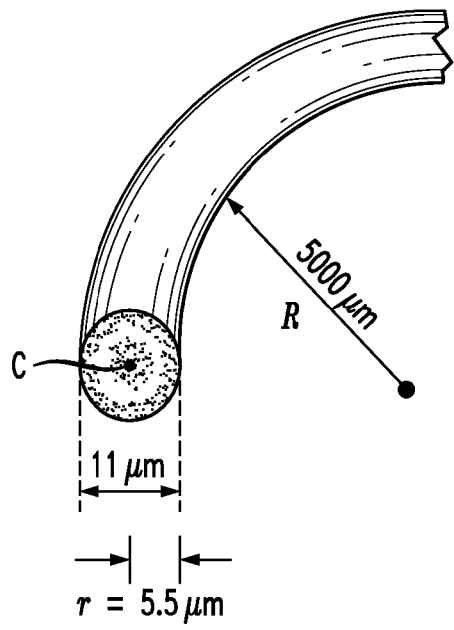
FIG. 4(a) illustrates a prior art arrangement with the mode field disposed near the center of a microfiber and FIG. 4(b) illustrates an embodiment of the present invention, using the same microfiber radius as shown in FIG. 4(a), but implementing a smaller bend radius R, sufficient to shift the mode field intensity away from areas where coupling into adjacent turns may occur.
Figure 4B:
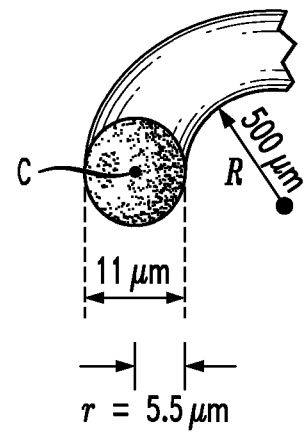

This necessary relationship between r and R, required to shift the modal intensity away from interfaces, is particularly illustrated in FIG. 4, which illustrates an exemplary portion of a single "turn" of an optical microfiber coil. FIG. 4(a) shows the situation where r and R do not satisfy the required relationship, and FIG. 4(b) shows an arrangement with the same microfiber radius r, but using a coil radius R that satisfies the required relationship. In particular, FIG. 4(a) illustrates a portion of optical microfiber 12 having a radius r=5.5 µm and wound around a central core rod (not shown) having a radius R=5000 µm. Using the relation of eq. (1), it can be shown that r and the expression $(R/\beta^2)^{1/3}$ are relatively equal values (a calculated value for the latter being approximately 5.5567 for n=1.5, λ=1.5 µm), exhibit the same order of magnitude, and the inequality of eq. (1) is not satisfied. As a result, the propagating fundamental mode will remain centered at central point C of the fiber, with the mode field intensity evenly distributed across the diameter of the fiber as shown, thereby creating high loss as the signal propagates through the coil.

In contrast, the arrangement of FIG. 4(b) illustrates an embodiment of the present invention, using the same microfiber of radius 5.5 µm as shown in FIG. 4(a). Here, the mode field intensity is clearly shown as shifted away from the center of the fiber and towards the extreme peripheral region of the microfiber by using a smaller radius of curvature, in this case R=500 µm. As discussed above, the shift in peak intensity of the mode field limits the contact/coupling of the signal from one turn to an adjacent turn, as well as the contact/coupling into a central core rod (if present). In accordance with the present invention, an optical microfiber coil can be utilized as a relatively small (compared to conventional fiber) delay line, while maintaining the desired low loss quality by confining the mode field to an exterior portion of the microfiber.

Figure 5A:
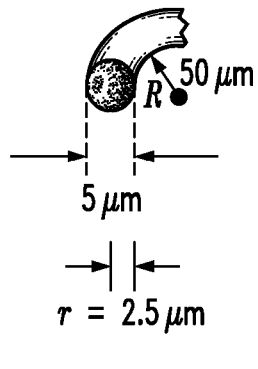
FIG. 5 illustrates the relationship between r and R for two additional microfiber embodiments of the present invention, where the illustration of FIG. 5(a) is associated with the values r=2.5 µm, R=50 µm and the illustration of FIG. 5(b) is associated with the values r=12 µm, R=5000 µm.
Figure 5B:
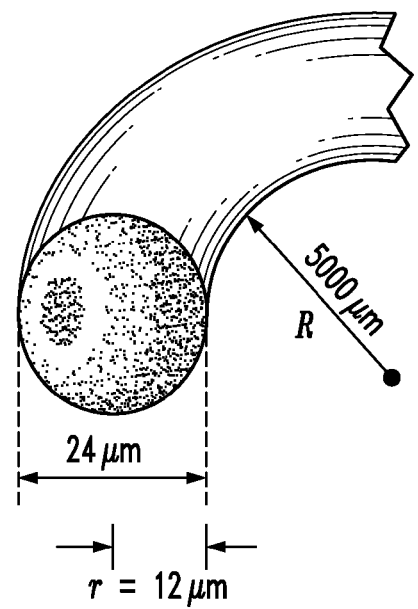

FIGS. 5(a) and (b) illustrate exemplary configurations for low loss optical microfiber coils formed in accordance with the present invention. In each case, it is clear that the peak intensity of the mode field has been shifted away from the central region of the microfiber. FIG. 5(a) shows a configuration using a microfiber having a radius r of 2.5 µm and coil radius R of 50 µm. FIG. 5(b) shows a configuration using a microfiber with a radius r=12 µm, and coil radius R=5000 µm. In each case, it is clearly shown that the mode field is confined to a geodesic located at the extreme peripheral portion of the turn.

As mentioned above, the small size and compactness of the inventive optical microfiber coil delay line allows it to be used in a variety of applications, such as optical gyroscopes, sensors, amplifiers, and the like. Indeed, the small dimensions of the inventive delay line allow for its inclusion with various types of integrated photonic systems and subsystems that utilize optical delay, for example, an optical buffer. Moreover, the arrangement of the present invention may take the form of a tunable delay line, where the time period of the delay is controlled by switching different sections of the microfiber coil into or out of the configuration to adjust the total length of the fiber delay line.

Figure 6:
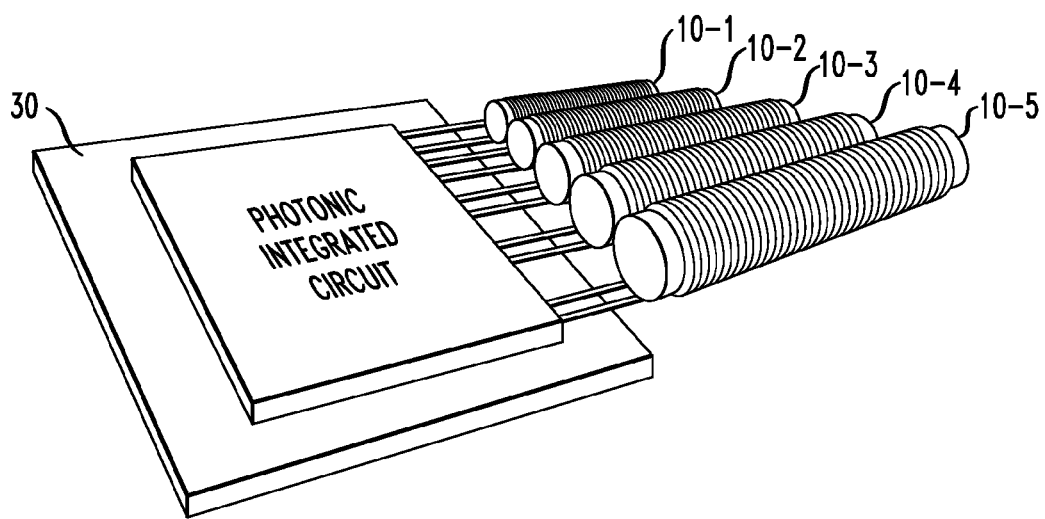
FIG. 6 illustrates an exemplary utilization of the optical microfiber coil of the present invention in a tunable configuration, comprising a plurality of separate microfiber coils that may be switched into or out of the system arrangement.
Figure 7:
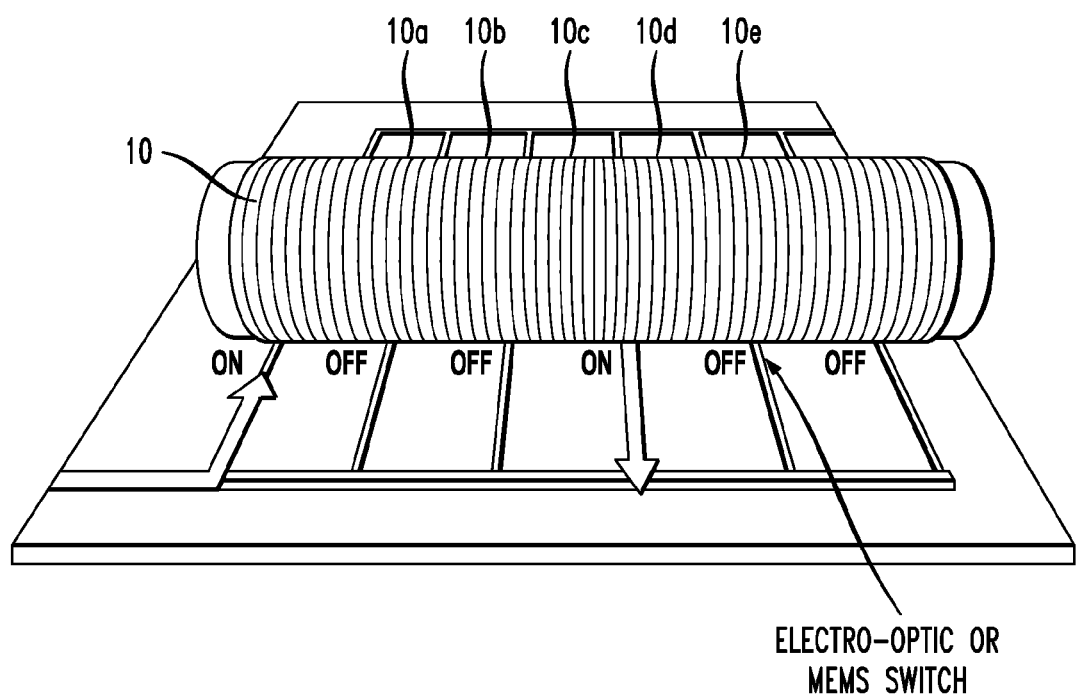
FIG. 7 illustrates an alternative embodiment of a tunable optical microfiber coil delay line of the present invention, where in this embodiment separate sections of a continuous coil may be switched into or out of the system.

FIG. 6 illustrates a utilization of the optical fiber coil of the present invention in an exemplary tunable configuration. In this arrangement, a plurality of separate optical fiber coils 10-1, 10-2, 10-3, 10-4 and 10-5 of different total lengths are separately coupled to an exemplary photonic integrated circuit 30. A set of switches within circuit 30 (not shown) may be used to control which one(s) of the separate coils are coupled into a delay line formed within circuit 30. FIG. 7 illustrates an alternative configuration for a tunable optical fiber coil, in this case using a single coil 10. For this arrangement, separate sections of coil 10, shows as $10_a$, $10_b$, $10_c$, $10_d$ and $10_e$ are controlled by associated switching signals to be used in the determination of the total length of the delay line. When a particular section or sections of coil 10 is/are to be turned "off", the switching arrangement of FIG. 7 will direct the propagating optical signal along a waveguide that bypasses the particular section(s) of coil 10, coupling the signal into the next section to be used. In the particular arrangement of FIG. 7, presume that each section $10_i$ would introduce 25 ns delay to a propagating optical signal. The switches are configured in this particular arrangement such that sections $10_a$, $10_b$ and $10_c$ are used in the delay structure, but sections $10_d$ and $10_e$ are bypassed. In this case, a total delay of 75 ns would be created. The ability to actively control the connection of each section of coil 10 allows for an adjustable delay to be formed relatively easily.

Dimensions of a tunable optical delay line having a specified delay time can be defined as follows. A volume V occupied by an exemplary microfiber coil is determined from the following relation:

$$V = \pi R^2 L.$$

The delay time t of the coil is proportional to the coil length and calculated from the following:

$$t = \pi n L R / c r,$$

where n is the refractive index of the optical fiber, L is the total length of the coil, R is the radius of the coil, r is the radius of the optical fiber and c is the speed of light in a vacuum. As mentioned above, for a wavelength λ of 1.5 µm, and a value for n of 1.5, the relation between r and R can take the form of $r \geq 0.7 R^{1/3}$ (when calculated in microns), allowing for the volume V to be expressed as:

$$V \approx 3(c/n) r^4 t.$$

It is clear from this relation that the volume of a coil, or the volume of a set of joined coils, rapidly decreases with decreasing optical fiber radius r. There is a practical limit, however, on how small the radius r can become. Evident from FIG. 5, it is clear that for relatively small radii (below, for example, 2.5 µm) the mode field intensity begins to encroach into areas where physical contact with other portions of the fiber become inevitable, thereby increasing the power loss of the propagating signal. Presuming a coil radius r=2.5 µm, the resultant coil volume V is approximated to a value of 0.4 T, where volume and time are measured in cubic mm and nanoseconds, respectively. Thus, an embodiment of the present invention comprising a plurality of microfiber coils providing a total delay time of 100 ns can be packaged in a box with dimensions of 1 mm×7 mm×7 mm, or 49 mm³.

In situations where either one or both of the optical fiber radius r and the coil radius R are non-uniform, the criteria for determining R(·) as a function of r(·) can be derived from an analysis of eq. (1). In particular, this relationship can be expressed as:

$$r(\cdot)^3 \gg \left(\frac{R(\cdot)}{\beta^2}\right), \text{ or}$$

$$\beta^2 r(\cdot)^3 \gg R(\cdot),$$

for all values of r(·).

While the present invention has been particularly described and shown with reference to particular embodiments, it should be understood by those skilled in the art that various changes in form and detail may be made therein without departing from the spirit and scope of the present invention as defined by the claims appended hereto.

What is claimed is:

1. A low loss optical fiber delay line comprising:
   a section of optical fiber having a diameter 2r greater than the wavelength λ of an optical signal propagating therethrough, the section of optical fiber wound into a coil of length L associated with a predetermined time delay t, the coil exhibiting a radius of curvature selected to satisfy the relation:

$$r \gg \left(\frac{R}{\beta^2}\right)^{1/3},$$

where β=(2πn)/λ, and n is the refractive index of the section of optical fiber, the relation between r and R confining a propagating optical mode into an extreme peripheral region of the optical fiber to minimize interaction between adjacent turns of the coil and limit propagation loss.

2. A low loss optical fiber delay line as defined in claim 1 wherein the section of optical fiber comprises a section of optical microfiber.

3. A low loss optical fiber delay line as defined in claim 1 wherein the length L of the created optical fiber coil is selected to provide the predetermined time delay t that satisfies the relation:

$$t = \pi n L R / c r,$$

where c is the speed of light in a vacuum.

4. A low loss optical fiber delay line as defined in claim 1 wherein the delay line further comprises
   a central core rod of radius R, with the section of optical fiber wound therearound.

5. A low loss optical fiber delay line as defined in claim 4 wherein the section of optical fiber and the central core rod comprise the same material.

6. A low loss optical fiber delay line as defined in claim 1, wherein n=1.5, λ=1.5 μm and r≈0.7 $R^{1/3}$.

7. A low loss optical fiber delay line as defined in claim 1 wherein the optical fiber comprises a non-uniform radius.

8. A low loss optical fiber delay line as defined in claim 4 wherein the central core rod comprises a non-uniform radius.

9. A tunable optical fiber delay line comprising
   a plurality of sections of optical fiber having a diameter greater than the wavelength λ of an optical signal propagating therethrough, each section of optical fiber wound into a coil of length L associated with a predetermined time delay t, the coil exhibiting a radius of curvature R selected to satisfy the relation:

$$r \gg \left(\frac{R}{\beta^2}\right)^{1/3},$$

where β=(2πn)/λ and n is the refractive index of the section of optical fiber, the relation between r and R confining a propagating optical mode into a region separated from a center area of the optical fiber.

10. A tunable optical fiber delay line as defined in claim 9 wherein at least one section of optical fiber comprises a section of optical microfiber.

11. A method of fabricating an optical fiber delay line exhibiting a predetermined time delay t, the method comprising the steps of:
    a) providing an optical fiber having a radius r greater that a wavelength λ of an optical signal propagating therethrough;
    b) selecting a core rod of a radius R that satisfies the relation:

$$r \gg \left(\frac{R}{\beta^2}\right)^{1/3};$$

c) winding the optical microfiber around the core rod to create a plurality of N turns sufficient to produce the predetermined time delay t.

12. The method as defined in claim 11, wherein in performing step a), an optical microfiber is provided.

13. The method as defined in claim 11, wherein in performing step a), the provided optical fiber comprises a non-uniform radius.

14. The method as defined in claim 11, wherein in performing step a), the provided optical fiber comprises a uniform radius.

15. The method as defined in claim 11, wherein in performing step b), the selected core rod comprises a non-uniform radius.

16. The method as defined in claim 11, wherein in performing step b), the selected core rod comprises a uniform radius.

* * * * *